United States Patent [19]
Brammer et al.

[11] 3,889,005
[45] June 10, 1975

[54] EMULSIFIER SYSTEM

[75] Inventors: Klaus-Rudiger Brammer; Theophil Wieske, Hamburg, both of Germany

[73] Assignee: Lever Brothers Company, New York, N.Y.

[22] Filed: Sept. 14, 1973

[21] Appl. No.: 397,505

[30] Foreign Application Priority Data
Sept. 15, 1972  Luxembourg............................ 66093

[52] U.S. Cl................................. 426/585; 426/602
[51] Int. Cl............................................... A23d 3/00
[58] Field of Search ............ 426/194, 202, 362, 350, 426/417, 337, 339, 340, 189

[56] References Cited
UNITED STATES PATENTS

| | | | |
|---|---|---|---|
| 1,917,249 | 7/1933 | Harris | 426/202 |
| 2,963,371 | 12/1960 | Young | 426/194 |
| 2,966,410 | 12/1960 | Chang | 426/194 |
| 2,996,387 | 8/1961 | Radlove | 426/194 |
| 3,047,401 | 7/1962 | Baur | 426/194 |
| 3,145,107 | 8/1964 | Howard | 426/194 |
| 3,158,487 | 11/1964 | Reid | 426/194 |
| 3,223,542 | 12/1965 | Pinkalla | 426/202 |
| 3,224,883 | 12/1965 | Pader | 426/362 |
| 3,388,999 | 6/1968 | Kurht | 426/362 |

OTHER PUBLICATIONS

Bailey's Industrial Oil & Fat, Swern, Third Edition, 1964.

*Primary Examiner*—Samih N. Zaharna
*Assistant Examiner*—Ernest G. Therkorn
*Attorney, Agent, or Firm*—James J. Farrell, Esq.; Melvin H. Kurtz, Esq.; Arnold Grant, Esq.

[57] ABSTRACT

The invention relates to emulsions, particularly low-calorie emulsions containing from 30–60 percent of fat, especially those of the water-in-oil type.

The emulsions are stabilized by partial glycerides of both saturated and unsaturated fatty acids, particularly monoglycerides.

The proportion of unsaturated fatty acid partial glycerides dominates the proportion of saturated fatty acid partial glycerides and the proportion of stearic acid partial glyceride dominates the remainder of saturated fatty acid partial glycerides.

8 Claims, No Drawings

3,889,005

EMULSIFIER SYSTEM

SUMMARY OF THE INVENTION

The present invention relates to edible emulsions containing a fatty phase, an aqueous phase and an emulsifier system, particularly to emulsions of the water-in-oil type and especially those of the so-called low-calorie type, e.g., those containing 30–60 percent of fat.

In this specification the term "fat" refers to both triglyceride mixtures which are liquid at ambient temperature and which are commonly referred to as "oils," and those triglyceride mixtures which are solid at that temperature and are generally called "fats."

In emulsions, particularly those having a relatively low fat content as compared with butter or margarine, the characteristics of the emulsifier system greatly influence both the emulsion stability of the product, which in turn can often directly be related to its microbiological stability, and the organoleptic properties, especially the melting characteristics, of the emulsion. Due to the nature of the emulsifier system on the one hand, for which commonly partial glycerides, i.e., mono- and/or diglycerides are used, and/or the proportion in which the emulsifier is used on the other hand, too coarse a water partition in the emulsion can easily occur which, although often resulting in still acceptable melting properties in the mouth, provide insufficient microbiologically stability. Vice versa very stable emulsions can be acceptable from, e.g., a microbiological point of view, but such emulsion systems will insufficiently destabilize in the mouth and consequently will result in unacceptable organoleptic properties of the product.

According to the present invention emulsions are provided comprising partial glycerides of saturated and unsaturated fatty acids, the proportion of unsaturated fatty acid partial glycerides dominating the proportion of saturated fatty acid partial glycerides and the proportion of stearic acid partial glyceride dominating the remainder of saturated fatty acid partial glycerides.

The emulsions of the invention are excellently spreadable, have a good emulsion stability during processing and storage and furthermore have pleasant melting properties in the mouth, which means that although the emulsions are sufficiently stabilized at temperatures up to 25°C they are at body temperature of an sufficient instability to make quick-melting and sudden flavour release possible.

Possibly the excellent properties of the emulsions of the invention can be explained as follows: Partial glycerides, which are commonly used for stabilizing emulsions, can be partial glycerides of either saturated or unsaturated fatty acids, e.g., stearic acid partial glyceride or partial glycerides of natural oils and fats which either before or after their preparation can have been subjected to hydrogenation. It is believed that high-melting saturated partial glycerides often crystallize during processing of the emulsion before they have reached the oil/water interface. The emulsions obtained will consequently be insufficiently stabilized in the initial period of their life; on storage, due to diffusion of the absorbed partial glycerides to said interface, the emulsion can become too stable which in turn results in inadequate organoleptic properties. Low-melting, unsaturated partial glycerides on the contrary will - due to their greater mobility - reach the oil/water interface at an earlier stage.

Emulsions containing the latter partial glycerides are, however, generally less stable than those containing solid partial glycerides.

To improve the deficiencies of emulsions containing either saturated or unsaturated fatty acid partial glycerides, the proportions of the partial glycerides were generally raised to levels which from an organoleptic point of view provide inadequate products.

A great advantage of the emulsion of the present invention is that they can contain a proportion of partial glycerides which is sufficient for adequate stabilization of the emulsion during processing and storage, without the organoleptic properties being detrimentally affected, which means that the emulsions of the present invention generally contain less emulsifier than was hitherto regarded to be possible. Preferably the weight ratio of unsaturated fatty acid partial glycerides to saturated fatty acid partial glycerides is from 1.5:1 to 10:1, particularly from 1.6:1 to 8:1.

Particularly advantageous are partial glyceride mixtures in which in the unsaturated fatty acid partial glycerides the proportion of polyunsaturated fatty acid partial glycerides is dominating.

Excellent results have been obtained by using partial glyceride mixtures in which the sum of the weight ratio of stearic acid partial glyceride to saturated fatty acid partial glycerides and the weight ratio of linoleic acid partial glyceride to unsaturated fatty acid partial glycerides, multiplied by 100, provide a standard figure of at least 110.

The partial glycerides to be used in accordance with the present invention can contain both mono- and diglycerides; the proportion of diglycerides in the partial glyceride mixture can amount to about 50 percent of the total partial glyceride content. Partial glyceride mixtures essentially consisting of monoglycerides are, however, particularly preferred.

The partial glyceride mixtures which are used according to the invention can, e.g., be obtained by esterification of the corresponding fatty acid mixtures with excess glycerin and subsequent distillative concentration of the monoglycerides, but also by suitable mixing of, e.g., highly concentrated partial glycerides, e.g., glycerin monostearate, palm oil monoglyceride, wholly or partly hardened palm oil monoglyceride and monoglycerides based on vegetable oils, e.g., sunflower oil, cottonseed oil or the like. Generally about 0.05 to 0.5 percent, particularly 0.08 to 0.16 percent of saturated partial glycerides, calculated on the total fat content, and 0.15 to 1.0 percent, particularly 0.25 to 0.5 percent of unsaturated partial monoglycerides, calculated on the total fat content, are used in the products of the invention, e.g., a total partial glyceride addition corresponding to about 1/200 to 1/600 of the dispersed aqueous phase.

Generally the total amount of partial glycerides required increases with the water content of the emulsion.

Preferably the emulsions prepared according to the invention are of the water-in-oil type.

Emulsions containing from 30–60 percent of fat, i.e., low-calorie fat spreads are particularly preferred.

SUch emulsions are preferably prepared by blending, emulsifying and cooling a suitable aqueous phase, a fat blend and an emulsifier, which comprises partial glycerides of saturated and unsaturated fatty acids, the proportion of unsaturated fatty acid partial glycerides dominating the proportion of saturated fatty acid partial glycerides and the proportion of stearic acid partial glyceride dominating the remainder of saturated fatty acid partial glycerides.

In the preparation of the emulsions according to the invention all oils and fats suitable for margarine preparation can be used.

Preferably, the dilatations of the fatty compositions should be such that the emulsions, particularly the low-calorie spreads, prepared therefrom are well-spreadable at refrigerator temperatures i.e. from 3°–8°C and that no oil exudation occurs at temperatures up to about 23°C.

It is also possible, however, to prepare the emulsions with butterfat. Although whole butter can be used for this purpose, it is recommendable to start from a non-refined, protein-free butterfat. A suitable protein-free butterfat can, e.g., be obtained by melting the butter and mixing the so obtained mixture consisting of fat, water and proteins with hot water. After the mixture thus obtained has been freed from water by centrifuging, the fat is dried in vacuo.

The aqueous phase which is used in the emulsions of the invention and which in low-calorie spreads is even the main component, is preferably substantially free of protein. However, if desired also proteins, e.g. milk protein and soybean protein, can be incorporated in amounts from about 0.5 to 5 percent, calculated on the final product. Preferably, the pH-value is adjusted at about 4.1 to 4.4 by means of edible acids, e.g., lactic and/or citric acid. Common salt can be added in amounts from 0 to 1 percent, preferably from 0.1 to 0.5 percent, calculated on the final product.

The preparation of the emulsions according to the invention can be effected by means of any suitable process. The partition of the disperse phase is preferably effected to an average water droplet size of 3 to 5µ diameter. A suitable process for the preparation of low-calorie spreads is, e.g., one in which the molten fatty phase containing the emulsifier, which should have a temperature of at least 28°C, is combined with an aqueous phase, which should have a temperature of at most 8°C, after which the partly crystallised mixture thus obtained, having a temperature ranging approximately from 5° to 20°C, is emulsified, worked and packaged. The apparatus used for such a process consists, in principle, of an emulsifying unit and a working unit. For the preparation of the emulsion any apparatus can be used which ensures a partition of the aqueous phase in the fineness desired, but which on the other hand does not require such an energy intake as to thermally endanger the stability of the emulsion. In this process emulsification and working of the emulsion can be carried out with or without external cooling. This process without cooling step is described in German Patent application (DOS) 2,110,575.

Alternatively, emulsions can, e.g., be prepared as follows: The molten fatty phase containing the emulsifier and the aqueous phase containing the water-soluble ingredients are fed into a scraped-surface cooler, either separately or combined shortly before feeding, and strongly cooled with intensive mechanical working. The undercooled emulsion subsequently passes to an uncooled so-called crystallising unit, in which it remains for a prolonged period and finally crystallises.

The invention will now be illustrated by means of the following Examples, in which all percentages and proportions are by weight unless otherwise stated.

EXAMPLE I

A low-calorie spread of the water-in-oil type was prepared from 4,000 g of a fat blend, consisting of
35% by weight of sunflower oil
5% by weight of coconut oil
60% by weight of an interesterified blend of
40 parts by weight coconut oil and
60 parts by weight palm oil
and 6,000 g of an aqueous phase.

The fat was melted and to the molten fat was added 3.2 g of a molecularly distilled monoglyceride derived from fully hydrogenated sunflower oil, having the following fatty acid composition:

| palmitic | acid | 7% |
|---|---|---|
| stearic | acid | 93% |

15.0 g of a molecularly distilled monoglyceride derived from unhydrogenated sunflower oil, having the following fatty acid composition:

| palmitic | acid | 7% |
|---|---|---|
| stearic | acid | 5% |
| oleic | acid | 28% |
| linoleic | acid | 60% |

The total monoglyceride mixture contained:

| 3.72 | g stearic acid |
|---|---|
| 9.0 | g linoleic acid |
| 5.0 | g saturated fatty acids |
| 13.2 | g unsaturated fatty acids. |

Calculated on the fat 0.12 percent of saturated fatty acid monoglycerides and 0.33 percent of unsaturated fatty acid monoglycerides were present.

The standard figure of the monoglyceride mixture was 142.5.

The aqueous phase contained 0.8 percent of common salt and was acidified to pH value 4.2 by a 50/50 mixture of lactic acid and citric acid.

This aqueous phase was added to the melted fat phase and the mixture obtained was intensively cooled, worked and packed at a temperature of 20°C.

The product obtained had an average droplet size of about 4µ and was excellently spreadable at refrigerator temperatures, i.e., about 3°–8°C, was elastic, stable at temperatures up to 25°C even when mechanically treated and had excellent organoleptic properties.

When for comparison a similar product was made under identical conditions except with a monoglyceride mixture of a standard figure of 60, a very stable product was obtained, which was, however, regarded as "chewing gum-like" in the mouth.

EXAMPLE II 1,200 g of protein-free butterfat, in which 1.2 g of partial glycerides of fully saturated palm oil and 5 g of distilled sunflower oil monoglycerides were dissolved, were emulsified as described in Example I with 2,500 ml water containing 0.4 percent of common salt. The sunflower oil monoglyceride was identical with that used in Example I.

The partial glycerides of palm oil contained:

| | | |
|---|---|---|
| palmitic | acid | 40% |
| stearic | acid | 60%. |

The total monoglyceride mixture contained:

| | | |
|---|---|---|
| 0.97 | g | stearic acid |
| 3.0 | g | linoleic acid |
| 1.80 | g | saturated fatty acids |
| 4.4 | g | unsaturated fatty acids. |

Calculated on the fat 0.15 percent of saturated fatty acid monoglycerides and 0.37 percent of unsaturated monoglycerides were present. The standard figure was 122.

The product obtained was already spreadable at a temperature as low as 8°C, had an excellent bacteriological keepability and a pleasant mouth feel.

EXAMPLE III

Example I was repeated except that 0.6 percent (calculated on the fat) of an emulsifier system was used, consisting of a mixture of 80 parts by weight of partial glycerides from cottonseed oil and 20 parts by weight of partial glycerides of fully hydrogenated sunflower oil.

The latter type of monoglycerides was described in Example I.

The cottonseed oil partial glycerides contained:

| | | |
|---|---|---|
| palmitic | acid | 24% |
| stearic | acid | 4% |
| oleic | acid | 18% |
| linoleic | acid | 54%. |

The total monoglyceride mixture contained:

| | | |
|---|---|---|
| 5.27 | g | stearic acid |
| 10.2 | g | linoleic acid |
| 10.2 | g | saturated fatty acids |
| 13.8 | g | unsaturated fatty acids. |

The standard figure was 130.

Calculated on the fat 0.254 percent of saturated and 0.346 percent of unsaturated partial glycerides were present.

The product obtained was of sufficient emulsion stability and further had excellent organoleptic properties.

EXAMPLE IV

Example I was repeated except that the molecularly distilled monoglyceride from fully hydrogenated sunflower oil was replaced by a synthetic stearic acid monoglyceride, and the molecularly distilled monoglyceride from unhydrogenated sunflower oil by a synthetic linoleic acid monoglyceride. The standard figure of the emulsifier system was 200.

The characteristics of the product obtained were very similar to those of Example I.

Similarly as exemplified before excellent emulsions can be obtained by using partial glyceride mixtures derived, e.g., from beef tallow and/or lard and/or palm oil and/or sunflower oil and/or safflower oil etc.

Care should be taken that the standard figure of the glyceride mixture is at least 110.

Although the glyceride mixtures illustrated were substantially free from trans-fatty acids, similar results will be obtained when up to about 50 or 70 percent of the unsaturated fatty acids have a trans configuration.

The trans-acids should in determining the standard figures be calculated as unsaturated fatty acids.

What is claimed is:

1. An improved edible emulsion, which is a low calorie fat spread of the water-in-oil type, having improved microbiological stability and organoleptic properties consisting essentially of 30–60 percent of a fatty phase, an aqueous phase and an improved emulsifier system therefor, said improved emulsifier system consisting essentially of saturated fatty acid partial glycerides and unsaturated fatty acid partial glycerides, the weight ratio of said unsaturated fatty acid partial glycerides to said saturated fatty acid partial glycerides being about 1.5–1 to 10–1 and wherein said saturated fatty acid partial glycerides have a dominant proportion of stearic acid partial glyceride.

2. Emulsion according to claim 1, in which the weight ratio of unsaturated fatty acid partial glycerides to saturated fatty acid partial glycerides is from 1.6:1 to 8:1.

3. Emulsion according to claim 1, in which in the unsaturated fatty acid partial glycerides the proportion of polyunsaturated fatty acid partial glycerides is dominating.

4. Emulsion according to claim 1, in which the sum of the weight ratio of stearic acid partial glyceride to saturated fatty acid partial glycerides and the weight ratio of linoleic acid partial glyceride to unsaturated fatty acid partial glycerides, multiplied by 100, provide a standard figure of at least 110.

5. Emulsion according to claim 1, in which the proportion of saturated fatty acid partial glycerides is from 0.05 to 0.5 percent, calculated on the total fat content.

6. Emulsion according to claim 5, in which the proportion of saturated fatty acid partial glycerides is from 0.08 to 0.16 percent, calculated on the total fat content.

7. Emulsion according to claim 1, in which the proportion of unsaturated fatty acid partial glycerides is from 0.15 to 1.0 percent, calculated on the total fat content.

8. Emulsion according to claim 7, in which the proportion of unsaturated fatty acid partial glycerides is from 0.25 to 0.5 percent, calculated on the total fat content.

* * * * *

UNITED STATES PATENT OFFICE
CERTIFICATE OF CORRECTION

PATENT NO. : 3,889,005
DATED : June 10, 1975
INVENTOR(S) : Klaus-Rudiger Brammer and Theophil Wieske It is certified that error appears in the above-identified patent and that said Letters Patent are hereby corrected as shown below:

In Claim 1, line 26, change "1.5-1 to 10-1" to read --1.5:1 to 10:1--.

*Signed and Sealed this*

*twenty-fifth* Day of *May 1976*

[SEAL]

Attest:

RUTH C. MASON
*Attesting Officer*

C. MARSHALL DANN
*Commissioner of Patents and Trademarks*